(12) United States Patent
Rohatschek

(10) Patent No.: US 8,331,390 B2
(45) Date of Patent: Dec. 11, 2012

(54) METHOD AND SYSTEM FOR COMPENSATING ASYMMETRICAL DELAYS

(75) Inventor: Andreas-Juergen Rohatschek, Wernau/Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 604 days.

(21) Appl. No.: 12/281,880

(22) PCT Filed: Feb. 9, 2007

(86) PCT No.: PCT/EP2007/051264
§ 371 (c)(1),
(2), (4) Date: Jan. 23, 2009

(87) PCT Pub. No.: WO2007/101767
PCT Pub. Date: Sep. 13, 2007

(65) Prior Publication Data
US 2010/0008456 A1    Jan. 14, 2010

(30) Foreign Application Priority Data
Mar. 8, 2006 (DE) .......................... 10 2006 011 059

(51) Int. Cl.
*H04L 12/28* (2006.01)
(52) U.S. Cl. ........................................ 370/419; 327/158
(58) Field of Classification Search .................. 370/419; 327/158
See application file for complete search history.

(56) References Cited

U.S. PATENT DOCUMENTS

| | | | |
|---|---|---|---|
| 4,168,469 A * | 9/1979 | Parikh et al. ................... 375/365 |
| 5,111,480 A | 5/1992 | Sarkoezi | |
| 5,450,492 A * | 9/1995 | Hook et al. ...................... 380/28 |
| 5,532,972 A * | 7/1996 | Pascucci et al. ......... 365/233.17 |
| 5,631,591 A * | 5/1997 | Bar-Niv ......................... 327/158 |
| 6,118,829 A * | 9/2000 | North ............................. 375/317 |
| 6,586,964 B1 | 7/2003 | Kent et al. | |
| 7,864,078 B2 * | 1/2011 | Rohatschek ..................... 341/51 |
| 2005/0102545 A1 * | 5/2005 | Clavequin et al. ............. 713/401 |

FOREIGN PATENT DOCUMENTS

DE    102005037263    2/2005

(Continued)

OTHER PUBLICATIONS

International Search Report, PCT International Patent Application No. PCT/EP2007/051264, dated May 24, 2007.

(Continued)

*Primary Examiner* — Robert Wilson
*Assistant Examiner* — Wei Zhao
(74) *Attorney, Agent, or Firm* — Kenyon & Kenyon LLP

(57) ABSTRACT

A method and a data-transmission system for transmitting data encoded in a signal between a transmitting user and a receiving user of the data-transmission system via a network structure of the data-transmission system. The data encoded in the signal are serially transmitted bit-by-bit in data frames having a defined structure. Each bit of the data encoded in the signal is sampled in the receiving user. Due to the transmission via the network structure, the signal is delayed asymmetrically. To compensate for the asymmetrical delay on the physical layer in the transmission channel, it is provided that the asymmetrical delay of the signal is determined at at least one point in the network structure, and is at least partially compensated prior to the receiving user sampling the bits of the data encoded in the signal. A measuring and compensating device is provided to measure and compensate for the asymmetrical delay.

27 Claims, 7 Drawing Sheets

FOREIGN PATENT DOCUMENTS

| DE | 102005060903 | 11/2006 |
| EP | 0309849 | 4/1989 |
| EP | 1335520 | 8/2003 |

OTHER PUBLICATIONS

Unihorn RW: "A robust fibre optic active star coupler for the SAE linear token-passing multiplex data bus" Proceedings of the IEEE 1988 National Aerospace and Electronics Conference: Naecon 1988, May 23, 1988, pp. 174-181, XP 010076888.

Walder et al, "Online Scheduling for Block-partitioned Reconfigurable Devices", Proceedings of the Design, Automation and Test in Europe Conference and Exhibition, IEEE, Mar. 2003, 5 pages.

* cited by examiner

METHOD AND SYSTEM FOR COMPENSATING ASYMMETRICAL DELAYS

FIELD OF THE INVENTION

The present invention relates to a method for transmitting data encoded in a signal between a transmitting user and a receiving user of a data-transmission system via a network structure of the data-transmission system. The data encoded in the signal are serially transmitted bit-by-bit in data frames having a defined structure. Each bit of the data encoded in the signal is sampled in the receiving user. Due to the transmission via the network structure, the signal is delayed asymmetrically. Furthermore, the present invention relates to a device which is disposed in a random location in a network structure of a data-transmission system. In addition, the present invention relates to a system for transmitting data encoded in a signal. Furthermore, the present invention relates to a user of a data-transmission system for transmitting data encoded in a signal, a communications controller of a receiving user of a data-transmission system for transmitting data encoded in a signal, a transceiver unit of a communications controller of a receiving user of a data-transmission system for transmission of data encoded in a signal, and also to an active star disposed in a network structure of a data-transmission system for the transmission of data encoded in a signal.

BACKGROUND INFORMATION

The networking of control units, sensor systems and actuator systems with the aid of a communications system and a communications link such as in the form of a bus system, has increased drastically in recent years in the construction of modern motor vehicles or also in machine construction, especially in the field of machine tools, as well as in automation. In this context, synergistic effects can be achieved by the distribution of functions to a plurality of control units. These are called distributed systems.

Increasingly, the communication between various users of such a data transmission system is taking place via a bus system. Communication traffic on the bus system, access and receiving mechanisms, as well as error handling are regulated by a protocol. One conventional protocol is, for instance, the FlexRay protocol, which is currently based on the FlexRay protocol specification v2.1. FlexRay is a fast, deterministic and error-tolerant bus system, especially for use in motor vehicles. The FlexRay protocol operates according to the principle of time division multiple access (TDMA), in which the users or the messages to be transmitted are assigned fixed time slots during which they have exclusive access to the communications link. The time slots repeat at a fixed cycle, so that the instant at which a message is transmitted via the bus can be predicted exactly, and the bus access takes place deterministically.

To optimally utilize the bandwidth for the message transmission on the bus system, FlexRay subdivides the cycle into a static and a dynamic portion. The fixed time slots are in the static portion at the beginning of a bus cycle. In the dynamic part, the time slots are assigned dynamically. Therein, the exclusive bus access is enabled for a short time only in each case, for the duration of at least one so-called mini slot. The time slot is lengthened by the necessary time only if a bus access takes place within a minislot. Consequently, bandwidth is used up only if it is also actually needed.

In the process, FlexRay communicates via one or two physically separate lines at a data rate of maximally 10 Mbit/sec in each case. Of course, it is also possible to operate FlexRay at lower data rates. The two channels correspond to the physical layer, in particular of the so-called OSI (open system architecture) layer model. They are used chiefly for the redundant and therefore error-tolerant transmission of messages, but can also transmit different messages, which would double the data rate. It is also possible that the signal transmitted via the transmission links results from the difference of signals transmitted via the two links. The physical layer is designed such that it allows an electrical but also an optical transmission of the signal(s) via the link(s) or a transmission in some other manner.

To realize synchronous functions and to optimize the bandwidth by small intervals between two messages, the users in the communications network require a common time base, the so-called global time. For the clock synchronization, synchronization messages are transmitted in the static portion of the cycle, the local clock time of a user being corrected with the aid of a special algorithm according to the FlexRay specification in such a way that all local clocks run in synchronism with a global clock.

In the transmission of data or messages via such a bus system, pulses are distorted because falling (high-to-low) or rising (low-to-high) flanks are delayed to different degrees on the transmission path. If the transmitted pulse is sampled multiple times (for example, n times per bit) in the receiver with the sample clock (the so-called sampling rate) existing there, then the position of the sampling point, i.e., the selection of exactly one of these n sampling values, decides whether the datum is sampled correctly or incorrectly. This is difficult especially when the sampling instant refers to a flank of the signal and also analyzes a plurality of binary data values (bits) of the transmitter relative thereto, over many periods of the sampling clock. In addition to a pulse distortion, the clock frequency deviation between transmitter and receiver also has an effect here. In this context, the signal to be sampled may be preconditioned in order, for example, to filter out short-duration interferences. Such a filter may then be implemented by evaluating a plurality of sampled signals in the time sequence with a majority decision (so-called voting). It has become clear that the rigid specification of the sampling instant without considering the asymmetrical delays on the different transmission paths leads to problems.

The delay between rising and falling edge of a signal is also known as pulse distortion or asymmetrical delay. Asymmetrical delays may have both systematic and stochastic causes. In the FlexRay protocol systematic delays affect only the rising edges, since synchronization is carried out to the falling edges. Stochastic delays have effects both on the rising and on the falling edges, and are caused by noise occurrences or EMC jitter. It may basically be said that the transmission of the signal via the network structure having passive and active network elements, e.g., connection links, transmitters, throttles, communications controllers, transceiver devices or voltage-level converters (so-called transceivers), active stars, etc. lead to the asymmetrical delay since rising and falling signal edges are propagated through the network structure in different manners.

Because of the fixed selection of the sampling instant per bit (for example, at n/2, in the middle of a bit, given n sampling values per bit), both the influence of the asymmetrical distortion as well as the frequency deviation and the additional time discretization by the sampling is a problem and place high demands on the transmission channel. Increasing the edge steepness so as to reduce the asymmetrical delays would indeed be advantageous for the timing, but on the other hand would require technically more sophisticated and thus more expensive components and, in addition, could have an adverse effect on the EMC response of the data transmission system. Therefore, it is sometimes more advantageous not to select the edge steepness to be so great; however, depending on the pulse distortion, one runs the risk of evaluating the wrong datum either at the one or the other bit boundary.

When realizing FlexRay data transmission systems, in particular in the case of complex systems that include a plurality of star couplers and passive networks, it has also been shown that the asymmetrical delay times that occur there are so great that they exceed a time budget specified by the FlexRay protocol. According to the FlexRay protocol, a sample counter is synchronized, i.e., is set back to 1, with the falling BSS (byte start sequence) edge. Sampling is carried out at a counter reading of 5. In an eight-fold oversampling as it is currently provided in FlexRay, three sampling cycles thus remain between the sampling instant (fifth sampling value) and the eighth sampling value, which, given a communications controller cycle of 80 MHz, thus correspond to 12.5 ns in each case and therefore to a time budget of 37.5 ns in total. This time budget is actually provided to compensate for asymmetrical delays due to the difference between the falling and rising edge steepness. However, as may be the case in complex network topologies or network structures, if the asymmetrical delay exceeds the provided time budget, then this leads an incorrect value being determined in a sampling at the fifth sampling cycle (counter reading of the cycle counter at 5), since the particular bit that should have been sampled was already available at an earlier instant due to the asymmetrical delay and is no longer present due to the early edge change. An analogous treatment holds true for an asymmetrical delay retarded in time. A time budget of four sample clocks corresponding to 50 ns is then available. If the time budget is exceeded in a manner advanced or retarded in time, decoding errors result, that is to say, false data are received.

These decoding errors may be detected by suitable error-detection algorithms, so that it is possible to initiate a renewed transmission of the bit or the entire data frame. A cyclic redundancy check (CRC), for example, may be used as error-detection algorithm. However, if the error detection algorithm responds too frequently, there is the disadvantage of the attendant reduced availability of the data transmission system.

In summary, it can be said that the FlexRay protocol makes demands that the physical layer is unable to meet—at least in the case of complex network topologies.

German Patent Application No. 10 2005 037 263 and German Patent Application No. 10 2005 060 903 describe possibilities for reducing the frequency of decoding errors due to an asymmetrical delay of the transmitted signal and for increasing the immunity of the data-transmission system with regard to asymmetrical delays. In both cases a modification on the logical level of the communications controller of the receiving user is proposed. German Patent Application No. DE 10 2005 060 903 suggests, in particular, to measure the asymmetrical delay of the received signal in the communications controller of the receiving user and to sample the bits of the data encoded in the received signal not at a fixed instant but at variable sampling instants, the optimal sampling instant being adjusted as a function of the measured asymmetrical delay. Furthermore, it is suggested in German Patent Application No. DE 10 2005 037 263 to define a sampling range that includes a plurality of sample clocks on the basis of the measured asymmetrical delay prior to the actual sampling, the data bit then no longer being decoded at a single fixed or variable sampling instant. Instead, the decoding of the data bits is implemented taking the values into account that are decoded at the sampling instants in the defined region. Given 8-fold oversampling, this makes it possible to compensate for asymmetrical delays of up to 87.5 ns without the occurrence of decoding faults. Given even higher oversampling, it would even be possible to compensate for correspondingly higher asymmetrical delay times.

SUMMARY

As an alternative or in addition to the conventional methods, example embodiments of the present invention may provide a possibility for achieving the compensation of the asymmetrical delay not by modifications on the logical level of the communications controller of the receiving user, but instead on the physical level on the transmission channel or in the network structure.

An object of the present invention is to transmit data in a data-transmission system at a high transmission rate, with high reliability and high availability of the data-transmission system; simultaneously, high immunity of the data-transmission system to asymmetrical delays should be ensured as well.

In one embodiment, the asymmetrical delay of the signal is determined at at least one point in the network structure and the asymmetrical delay is at least partially compensated even before the receiving user samples the bits of the data encoded in the signal.

The determination of the asymmetrical delay of the transmitted signal can be estimated, modeled or measured at the factory already. The asymmetrical delay determined at the factory is either stored directly or only after conversion into a corresponding compensation value. To compensate the asymmetrical delay during the operation of the data-transmission system, the stored value is then accessed and the asymmetrical delay compensated for at least partially.

Furthermore, it is possible that the asymmetrical delay of the transmitted signal is determined online, so to speak, during the operation of the data-transmission system. The asymmetrical delay determined online can be estimated, modeled or measured. The determined asymmetrical delay may either be stored initially and later be utilized for the compensation or else it may be used directly for compensating the asymmetrical delay. Using the delay values determined online and stored, it is also possible to evaluate the asymmetrical delay values that occurred in the past, for instance to detect errors in the measurement of instantaneous asymmetrical delay values or to model or predict asymmetrical delay values to be expected in the future.

The asymmetrical delay of the transmitted signal may be partially compensated in that, for example, the signal edges that are delayed to a lesser degree by the transmission via the network structure are additionally delayed in order to adapt them to the more heavily delayed falling or rising signal edges, thereby reducing or preferably compensating the difference between the delay of rising and falling signal edges. A programmable delay unit may be disposed in the network structure for the delay of the less heavily delayed signal edges. Programmable delay units as such are currently available. A delay unit of this type is offered for sale and distributed by, for example, the Dallas Semiconductor Corp., Dallas, Tex. 75244, U.S.A., a daughter company of Maxim Integrated Products, Inc., Sunnyvale, Calif. 94086, U.S.A. under the designation "DS1021-50". The conventional delay unit of Dallas Semiconductor allows delay times of 10 to 140 ns to be set with an accuracy of 0.5 ns. The conventional delay unit is programmed by setting or deleting a plurality of bits such as 8 bits, for example. A coarser resolution may be useful as well, for instance when 25 ns are compensated at an accuracy of 3 ns.

An advantage of the present invention is that it allows a compensation of the asymmetrical delay of transmitted signals, or an increase in the immunity of the data-transmission system to asymmetrical delays, without the need for modifications on the logical level of the receiving users or their communications controller. According to example embodiments of the present invention, the asymmetrical delay is thus reduced or possibly even compensated on the physical level in the transmission channel, so that merely a slight or possibly no asymmetrical delay may still be detectable in the receiving users. This has the advantage that conventional modules, possibly even of lower quality and thus considerably more economical modules, may be utilized for communications-controller and/or transceiver components in the receiving users without the occurrence of decoding errors.

Of course, it is also possible to use the present invention for the users proposed in German Patent Application No. DE 10 2005 037 263 and German Patent Application No. DE 10 2005 060 903 with improved sampling of the received signal.

An embodiment of the present invention is described by way of example based on a FlexRay data transmission system. However, this is not to be understood as a restriction with regard to the present invention. Instead, the present invention may be used for many different types of data-transmission systems and is readily transferable to comparable systems. In particular, it is possible to use the present invention in data-transmission systems that transmit data according to the TTP/C (time triggered protocol class C), the CAN (controller area network) or the TTCAN (time triggered CAN) protocol.

In FlexRay data-transmission systems, a nominal bit length of 100 ns results at a data-transmission rate of 10 Mbit/sec. Currently available FlexRay transceiver modules generally require a minimum bit time of approximately 80 ns; shorter bit times are no longer able to be detected or processed by the transceiver modules without additional restrictions such as additional asymmetry. However, asymmetrical delays of the transmitted signals lead to partly considerably shortened bit times in the receiving user. For example, given an asymmetrical delay of 60 ns, the nominal bit length of 100 ns is shorted to a bit length of only 40 ns. The current FlexRay transceiver modules could not at all process such short bit times. However, the present invention may make it possible to reduce the asymmetrical delay considerably, for instance to 5 ns, so that the bit length available at the receiving user still amounts to 95 ns and thus lies considerably above the minimum bit length of approximately 80 ns required by the FlexRay transceiver module.

According to an advantageous further development of the present invention, the asymmetrical delay is measured with the aid of an interval in a change of the signal from rising to falling edge or from falling to rising edge absolutely required in a transmission protocol used in the data-transmission system. In an advantageous manner, the interval between a rising edge of a frame start sequence (FSS) and a falling edge of a byte start sequence (BSS) of a data frame is measured. The measurement is preferably carried out at least once for each active data transmission path. In this context, an increase in the number of the measured values reduces the influence of stochastic corruptions. In particular, the measurements can also be continued during the data transmission and the compensation of the asymmetrical delay be adaptively adjusted even prior to the decoding of the data bits, in the course of the transmission. It is also possible to detect errors if contradictory measured values for the asymmetrical delay should result from multiple measurements.

It is possible to provide programmable delay units at one or several random points in the network structure of the data-transmission system, which selectively reduce or even compensate the asymmetrical delay of the transmitted signals. The compensation of the asymmetrical delay with the aid of the programmable delay unit may be implemented on the basis of values for the asymmetrical delay of the signal determined prior to the use of the data-transmission system, i.e., prior to the actual data transmission. The determination of the asymmetrical delay values in advance of the data transmission may take place at the factory, for example, or on the basis of the ready-for-use data-transmission system installed in a motor vehicle, for instance, by estimation, modeling or measuring.

However, an adaptive method, in which the asymmetrical delay of the transmitted signal is determined online, so to speak, preferably measured, during the actual data transmission is much more flexible, much safer and more reliable. To realize this adaptive method, a measuring device measuring the asymmetrical delay of the transmitted signal is assigned to the programmable delay unit in addition. This measuring and compensating device has an arrangement to measure the programmable delay unit and for the at least partial compensation of the asymmetrical delay of the signal may, as mentioned, be disposed at random points within the network structure, but in any event upstream from the sampling device (also known as decoders) for sampling of each bit of the data encoded in the signal in the receiving user. It is possible, in particular, to place one or a plurality of such measuring and compensating devices in a connection link of the network structure, in an active or passive star of the network structure, or in what is generally referred to as a transceiver or in a communications controller of a receiving user.

BRIEF DESCRIPTION OF THE DRAWINGS

Additional advantages and advantageous further developments of the present invention are described below.

DETAILED DESCRIPTION OF EXAMPLE EMBODIMENTS

Figure 1:
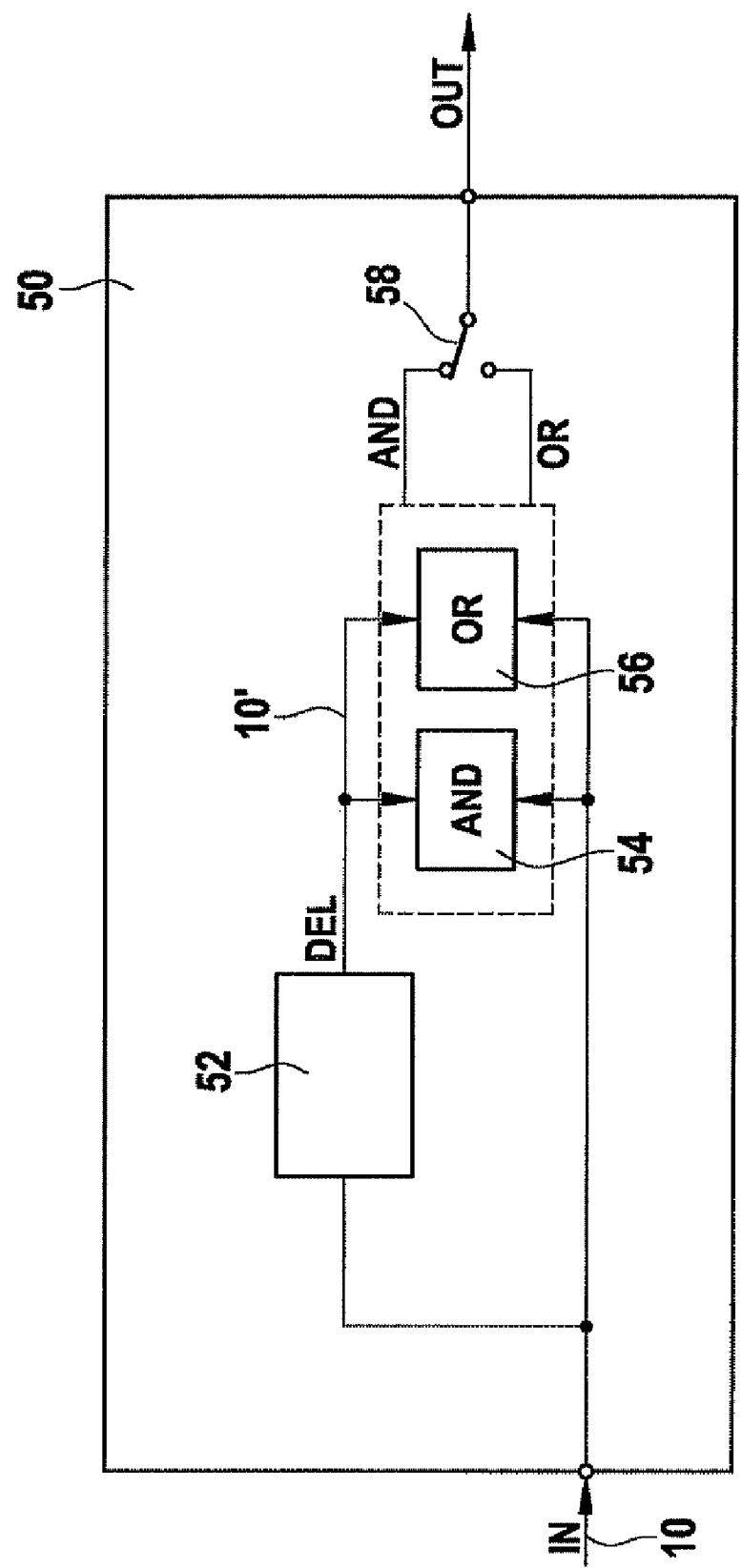
FIG. 1 shows an example device according to the present invention for measuring and partially compensating an asymmetrical delay of a signal transmitted via a data-transmission system according to the present invention.

The networking of control units, sensor systems and actuator systems with the aid of a communications system and a communications link such as in the form of a bus system, has increased drastically in recent years in the construction of modern motor vehicles or also in machine construction, especially in the field of machine tools, as well as in automation. Synergy effects by distributing functions to a plurality of users, which are embodied as control devices, for example, are able to be achieved in the process. These are called distributed systems.

Increasingly, the communication between various users of such a data transmission system is taking place via a bus system. Communication traffic on the bus system, access and receiving mechanisms, as well as error handling are regulated by a protocol. One conventional protocol is, for instance, the FlexRay protocol, which is currently based on the FlexRay protocol specification v2.1. FlexRay is a fast, deterministic and error-tolerant bus system, especially for use in motor vehicles. The FlexRay protocol operates according to the principle of time division multiple access (TDMA), in which the users or the messages to be transmitted are assigned fixed time slots during which they have exclusive access to the communications link. The time slots repeat at a fixed cycle, so that the instant at which a message is transmitted via the bus can be predicted exactly, and the bus access takes place deterministically. FlexRay communicates via one or two physically separate lines at a data rate of maximally 10 Mbit/sec in each case. Of course, it is also possible to operate FlexRay at lower data rates. The two channels correspond to the physical layer, in particular of the so-called OSI (open system architecture) layer model. They are used chiefly for the redundant and therefore error-tolerant transmission of messages, but can also transmit different messages, which would double the data rate. It is likewise possible that the transmitted signal is yielded as a differential signal from the difference between the two signals transmitted via the lines. The signal transmission via the physical layer may take place electrically, optically, or in any other way as desired.

To realize synchronous functions and to optimize the bandwidth by small intervals between two messages, the users in the communications network require a common time base, the so-called global time. For the clock synchronization, synchronization messages are transmitted in the static portion of the cycle, the local clock time of a user being corrected with the aid of a special algorithm according to the FlexRay specification in such a way that all local clocks run in synchronism with a global clock.

The present invention is described by way of example on the basis of on a FlexRay data transmission system. However, this is not to be understood as a restriction with regard to the present invention. Instead, the present invention may be used for many different types of data-transmission systems and is readily transferable to comparable systems (such as CAN, TTCAN, TTP/C etc.).

Figure 7:
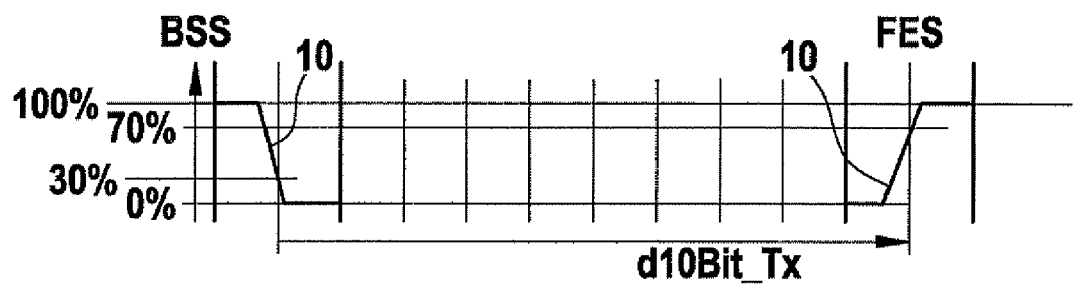
FIG. 7 shows a signal pattern at a falling or rising edge in a data-transmission system without compensation of the asymmetrical delay.
Figure 8:
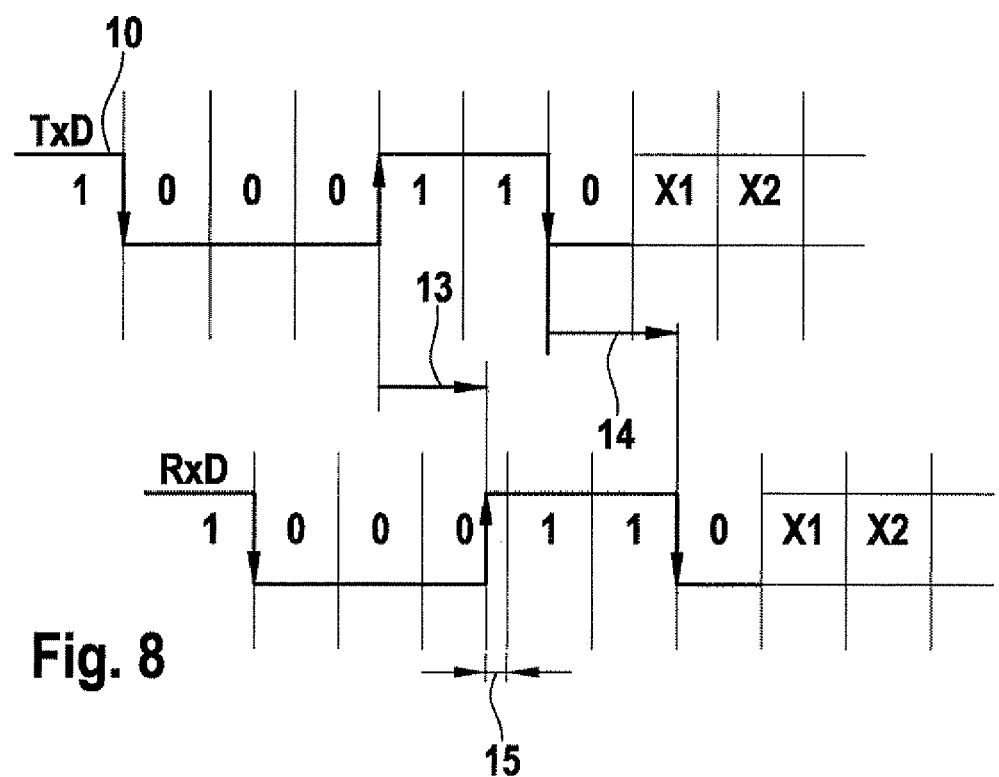
FIG. 8 shows patterns of a signal emitted by a transmitting user and a signal received by a receiving user without compensation of the asymmetrical delay.

FIG. 7 shows that signals 10 in the region of edge changes from high to low or from low to high have no ideal rectangular characteristic, but a slanted, ramp-like characteristic. It can be seen that the gradient of the falling edge and of the rising edge is different. This difference causes the resulting delays for rising and falling edges to differ (cf. FIG. 8). Depending on the difference of the delays for rising edges 13 and falling edges 14, there results an asymmetrical delay 15. In FIG. 8, the pattern of signal 10 (TxD) emitted by a transmitting user is shown on top, and the pattern of signal 10 (RxD) received by a receiving user is shown at the bottom. Delays 13, 14 pertain to the difference of the corresponding edges between transmitted signal TxD and received signal RxD.

In the transmission of data or messages via a bus system with such delays, pulses are distorted because high-to-low and low-to-high edges are delayed to different degrees on the transmission path. If the transmitted pulse is sampled repeatedly (for instance, 8 times per bit in eight-fold oversampling) in the receiver, using the sampling clock cycle (the so-called sampling rate) available there, then the position of the sampling point, i.e., the selection of precisely one of these eight sampling values decides whether the datum is sampled correctly or incorrectly. This will be elucidated in greater detail in the following text based on FIGS. 9 and 10.

Figure 9:
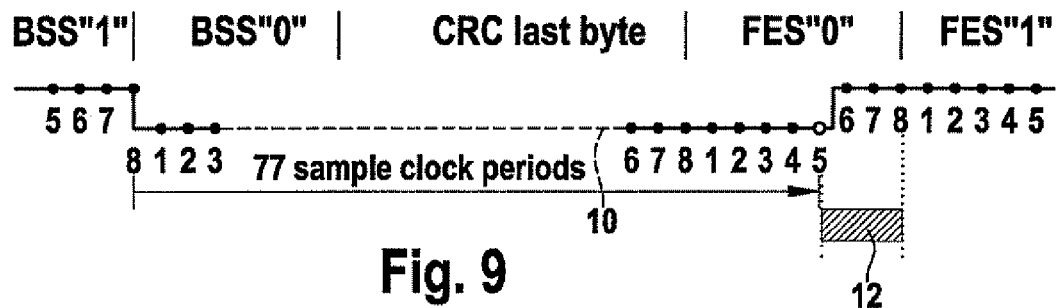
FIG. 9 shows a method for decoding a signal in the fifth sampling point.
Figure 10:
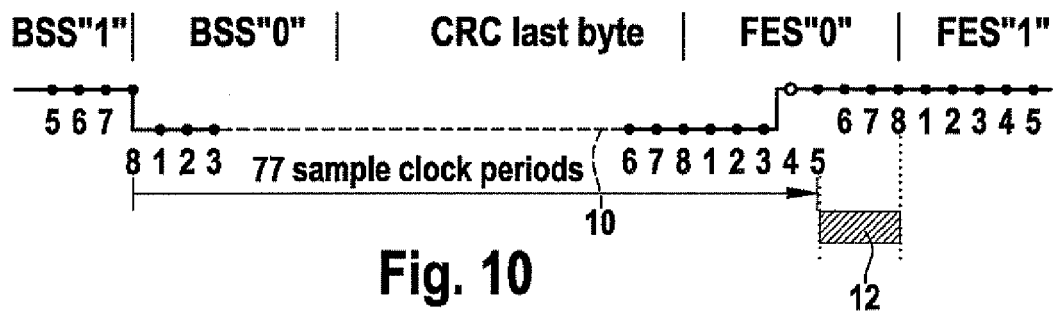
FIG. 10 shows a method for decoding a signal in the fifth sampling point including decoding errors.

The received signal to be decoded is denoted by reference numeral 10. The decoding is synchronized to the falling BSS (byte start sequence) edge. At the instant of synchronization, a sampling counter begins running and is reset (set to 1, for instance) whenever counter reading 8 is reached. In the examples of FIGS. 9 and 10, the data bit encoded in signal 10 is sampled in the fifth sampling point in each case. The rigid specification of the sampling instant, without consideration of the asymmetrical delays on the different transmission paths, causes problems.

The rigid selection of the sampling instant per bit (for instance, with eight sampling values per bit, to fifth sampling value, in the middle of a bit), both the influence of the asymmetrical delay and the frequency deviation as well as the additional time discretization by the sampling are a problem and place high demands on the transmission channel. Increasing the edge steepness in order to reduce the asymmetrical delays would indeed be advantageous for the timing, but on the other hand would require technically more sophisticated and thus more expensive components (such as transceiver, communications controller) and, in addition, would have an adverse effect on the EMC response of the data transmission system. However, depending on the pulse distortion, there is the risk of evaluating the wrong datum either at the one or the other bit boundary. This becomes apparent in FIGS. 9 and 10.

The pending edge change should ideally take place precisely at counter reading 8 between FES "0" and FES "1". However, due to the asymmetrical delays it is shifted in the advance direction in FIG. 9, to such an extent that the edge change occurs precisely between the fifth and sixth sampling value. This is non-critical in this example insofar as the sampling instant still lies before the edge change and the bit (0) preceding the edge change can still be decoded correctly.

In FIG. 10 the edge change is shifted even further in the advance direction due to greater asymmetrical delays, so that it now lies before the sampling instant between the third and the fourth sampling value. Now, it is no longer possible to detect the correct bit value (0). Instead, an incorrect bit value (1) is detected at the sampling instant at the fifth sampling value; a decoding error occurs.

When realizing FlexRay data transmission systems, in particular in the case of systems that have relatively complex network structures or topologies encompassing a plurality of star couplers as well as other active and passive modules, it has been shown that the asymmetrical delay times that occur there are so great that they exceed a time budget specified by the FlexRay protocol. According to the FlexRay protocol, the sampling counter is synchronized, i.e., reset, with a falling BSS (byte start sequence) edge. Sampling occurs at a counter reading of 5. In an eight-fold oversampling as it is currently provided in FlexRay, three sampling clocks thus still remain between the sampling instant (fifth sampling value) and the eighth sampling value; given a communication controller cycle of 80 MHz, these each amount to 12.5 ns, that is to say, a total time budget (12 in FIGS. 9 and 10) of 37.5 ns. This time budget 12 is actually provided to compensate for asymmetrical delays due to the difference between falling and rising edge steepness. However, if—as may happen with complex network topologies—the asymmetrical delay exceeds the provided time budget 12 (cf. FIG. 10), then this has the result that an incorrect value is determined in a sampling in the fifth sampling cycle.

Figure 11:
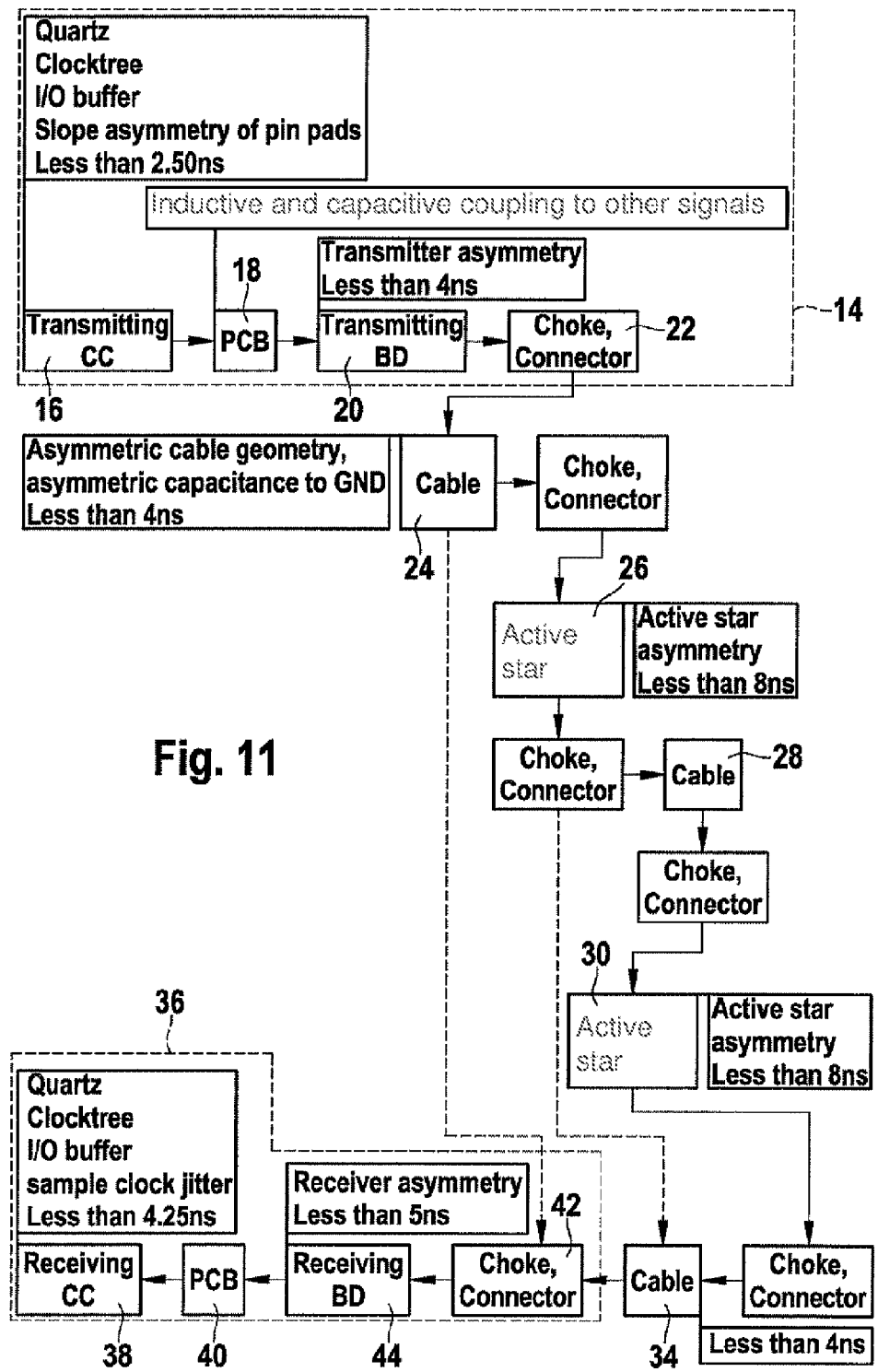
FIG. 11 shows one example for a signal chain of a transmission channel in a data-transmission system with corresponding exemplary values for a resulting asymmetrical delay without the EMC component.

A data transmission path (or transmission channel) in a somewhat more complex network topology is shown by way of example in FIG. 11 with the corresponding resulting delay times for the asymmetrical delay. The data transmission path includes a transmitting user 14 having a communications controller (CC) 16, a printed circuit board having circuit traces and components (PCB) 18, and a transmitter. The transmitter includes a bus driver (BD) 20 and a termination element (CMC, common mode choke) 22. With the aid of a first passive network 24, which essentially includes connection links, transmitting user 14 is connected to a first active star node 26, which includes two separate bus drivers, among others.

First star node 26 is connected to a second active star node 30, which likewise includes two separate bus drivers, via a second passive network 28 (additional connection links). Via another passive network 34 (additional connection links), star node 30 is connected to a receiving user 36. This receiving user includes a communications controller CC 38, a printed circuit board (PCB) 40, and a receiver. The receiver includes a termination element (CMC; termination) 42, and a bus driver (BD) 44.

The corresponding estimated, modeled and/or calculated time data for the asymmetrical delay (without the EMC component) are indicated in FIG. 11 for the different components and must be summed up to determine the entire asymmetrical delay. Given the exemplary numerical values, an asymmetrical delay of approximately 39.75 ns results. This is above the previously determined time budget 12 of approx. 37.5 ns. In addition there are also stochastic EMC influences, which further increase the asymmetrical delay. As a result, the conventional decoding method is unable to continue functioning properly at certain instants in the network topology from FIG. 11 while maintaining the desired high data rate of approximately 10 Mbit/sec.

In summary, it can be said that the FlexRay protocol makes demands that the physical layer is unable to sustain at least in the case of complex network topologies. The present invention is able to remedy this matter.

According to the present invention, a method for the at least partial compensation of the asymmetrical delay of signals 10 transmitted via a transmission channel is provided, which does not require any change in the logical layer of the communications controller of receiving user 36. Instead, the compensation according to the present invention is provided in the physical layer in the transmission channel at one or several random locations between the encoding of the signal to be transmitted in the transmitting user 14, and the decoding of the received signal in the receiving user 36. To this end, the asymmetrical delay is at least partially compensated at a random point in the network structure between transmitting user 14 and receiving user 36, in that the particular rising or falling signal edge that experiences a smaller delay than the other falling or rising signal edge by the transmission through the network structure is delayed to such an extent that its delay roughly corresponds to the delay of the more heavily delayed rising or falling signal edge. This reduces the interval between the delays of the propagated rising and falling signal edges and thus reduces or preferably even compensates the asymmetrical delay.

As mentioned, the additional delay of the signal edge that is less heavily delayed due to the transmission via the transmission channel, may be implemented at any random point in the network structure, i.e., also in transmitting user 14 or in the receiving user 36 or in a communications controller 16, 38 of these users 14, 36 or in a transceiver unit of these users 14, 36. Decisive is that the additional delay within the meaning of the present invention takes place after coding of the signal in transmitting user 14 and prior to decoding of the signal in receiving user 36. According to the present invention, a programmable asymmetry compensation is thus serially inserted into the signal chain in the transmission channel. Due to the asymmetry compensation, the signal asymmetry intrinsically present in the signal chain is counteracted.

The required amount of the asymmetry compensation is determined in the received protocol frame (the received data frame) by a measurement or it is applied by fixed programming in a bus-driver module 44 of receiving user 36 at the factory, or applied by fixed programming in the network structure at the factory (by the vehicle manufacturer in whose vehicle a data-transmission system according to the present invention is installed).

One advantage of the present invention is that the entire data-transmission system is more robust with respect to asymmetrical components in the installed units, and the units therefore need not comply with strict tolerance specifications so that less expensive modules and components may be used without causing decoding errors due to the asymmetrical delay of transmitted signal 10. Furthermore, the transmission reliability and thus the availability of the entire data-transmission system is able to be increased.

To realize the present invention, one or a plurality of devices for measuring and at least partially compensating asymmetrical delay may be disposed at random locations in the network structure. Such a device is shown in FIG. 1 by way of example and denoted by reference numeral 50 as a whole. Device 50 includes a programmable delay unit 52, such as that which is offered for sale and distributed by, for instance, the Dallas Semiconductor Corp., in Dallas, Tex., U.S.A. under the designation "DS 1021-50". Such a delay unit 52 is able to selectively delay a signal by a programmable delay duration, which lies in a range between 10 and 140 ns, for example, with an accuracy of less than 1 ns, preferably with an accuracy of 0.5 ns. The duration of the delay is programmed by setting or deleting a plurality of bits, such as eight bits, for example. Of course, other programmable delay units having a higher or lower delay range and higher or lower accuracy may be utilized as well.

An input signal 10 applied at an input IN of measuring and compensating device 50 is forwarded directly, for one, and routed into programmable delay unit 52 following a branching point, for another. Delayed signal 10' at the output of delay unit 52 is denoted by DEL (delayed). Both the original input signal 10 and delayed signal 10' are either conjugated at an AND gate 54 or deconjugated at an OR gate 56. Via a switch 58, which may be embodied as a transistor, for instance, either the conjugation (AND operation of signals 10, 10') or the disjunction (OR operation of signals 10, 10') is applied at the output OUT of device 50.

Figure 2:
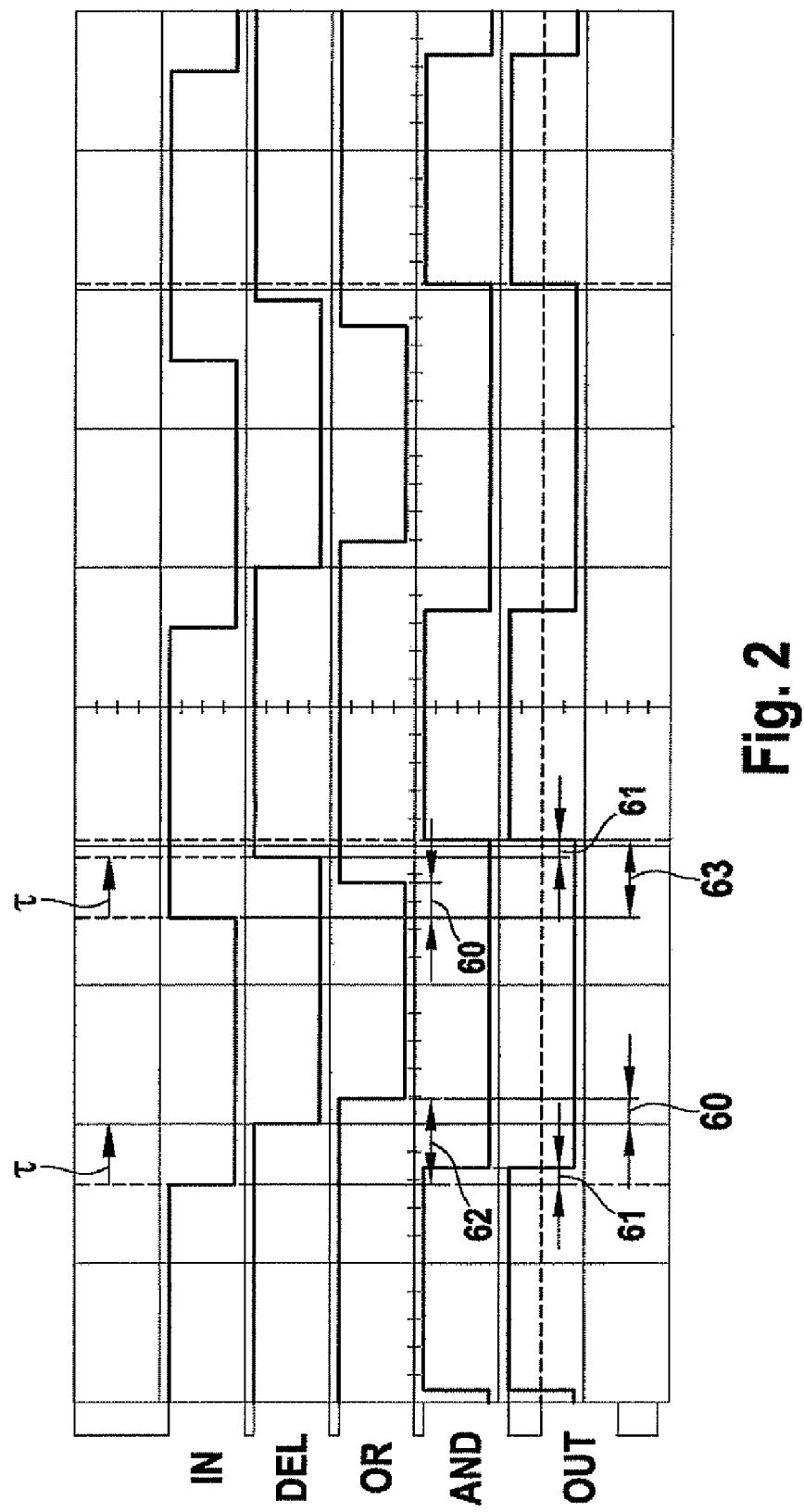
FIG. 2 shows signal patterns of the device of the present invention from FIG. 1.

The effect of measuring and compensating device 50 on the signal pattern is illustrated in FIG. 2. Input signal IN is exemplarily delayed by the value r. The combined quantity of the regions in which input signal IN and delayed signal DEL have the value "1" results in available intermediate signal OR. The cut set of the regions in which signals IN and DEL both have the value "1" constitutes available intermediate signal AND. In the signal patterns illustrated in FIG. 2 by way of example, switch 58 in the position shown in FIG. 1, on AND, so that the output signal OUT corresponds to intermediate signal AND.

Reference numeral 60 in FIG. 2 denotes the delay of the signal due to the signal propagation time in OR gate 56. In the same way, reference numeral 61 denotes the signal delay of intermediate signal AND due to the signal propagation time in AND gate 54. The additional delay of a falling signal edge by measuring and compensating device 50 results at the OR intermediate signal and is denoted by reference numeral 62. The additional delay of a rising signal edge results at the AND intermediate signal and is denoted by reference numeral 63. That is to say, if AND intermediate signal is applied at the output OUT of device 50, then the rising signal edge of signal 10 is delayed by the value $\tau$ plus delay 61 due to the signal propagation time in AND gate 54. The falling signal edge of input signal 10 is likewise delayed by delay value $\tau$ plus the delay due to the signal propagation times in OR gate 56, if the OR intermediate signal is applied at the output OUT of device 50. That is to say, by using measuring and compensating device 50 according to the present invention, it is possible to selectively delay rising or falling signal edges of the transmitted signal by delay value $\tau$, while taking the signal propagation times in logic gates 54 and 56 into account. Whether the falling or the rising signal edge is delayed by device 50 may be selected by switch 58; delay duration $\tau$ is programmed via the 8-bit.

Figure 3:
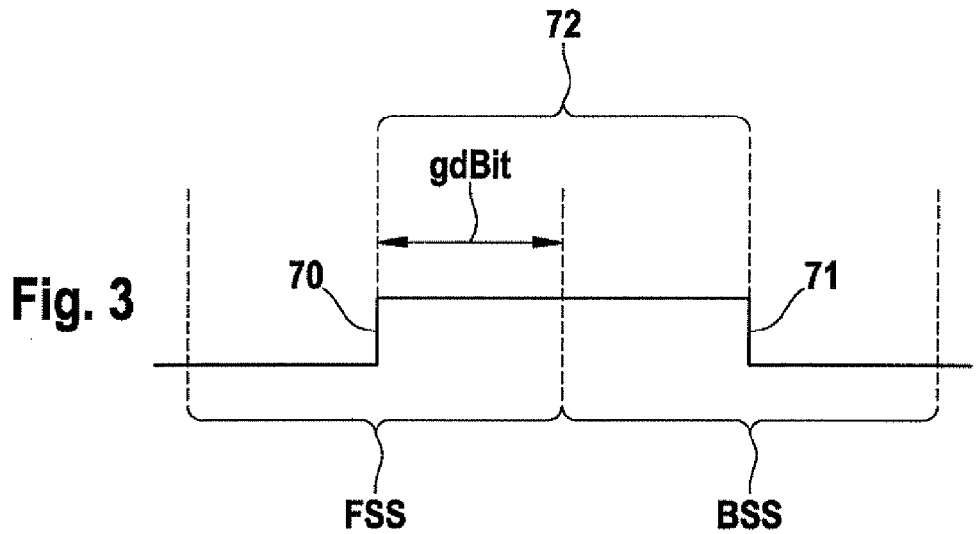
FIG. 3 shows a change of the signal from rising edge of a frame start sequence (FSS) to falling edge of a byte start sequence (BSS) required in a transmission protocol used in a data-transmission system, for measuring the asymmetrical delay according to the present invention.

To determine delay value $\tau$ by which the rising or falling signal edge of signal 10 is to be delayed, the asymmetrical delay is first measured. The asymmetrical delay may be measured on the basis of, for instance, an interval of a change of signal 10 from rising to falling edge or from falling to rising edge absolutely required in a transmission protocol used in the data-transmission system (cf. FIG. 3). For instance, the FlexRay transmission protocol allows the interval between a rising edge 70 of a frame start sequence (FSS) and a falling edge 71 of a byte start sequence (SS) of a data frame to be measured. The measured interval is denoted by reference numeral 72 in FIG. 3. Nominal interval gdBit between rising edge 70 of frame start sequence FSS and the end of FSS amounts to nominally 100 ns. Thus, if the asymmetrical delay is equal to 0, nominal interval 72 according to FlexRay protocol specification v2.1 amounts to 200 ns. In eight-fold oversampling, this corresponds to precisely 16 nominal sampling period durations. Delay value $\tau$ required for compensating the measured asymmetrical delay may be determined from measured interval 72 using a combinatorics or a suitable calculation algorithm, for example.

Measuring and compensating device 50 may include a processor, in particular a digital signal processor (DSP), or a state machine for processing a computer program and for realizing the example method of the present invention for compensating the asymmetrical delays on the transmission channel. Depending on the development of the present invention, the computer program may initiate the reading in of delay value $\tau$ from a memory element or the measuring of the asymmetrical delay and a determination of delay value $\tau$. Subsequently, delay unit 52 is programmed, once again initiated by the computer program, as a function of determined delay value $\tau$, so that the desired time delay is achieved. Depending on whether the falling or the rising edges of signal 10 are to be delayed, switch 58 is triggered correspondingly by the computer program.

Figure 4:
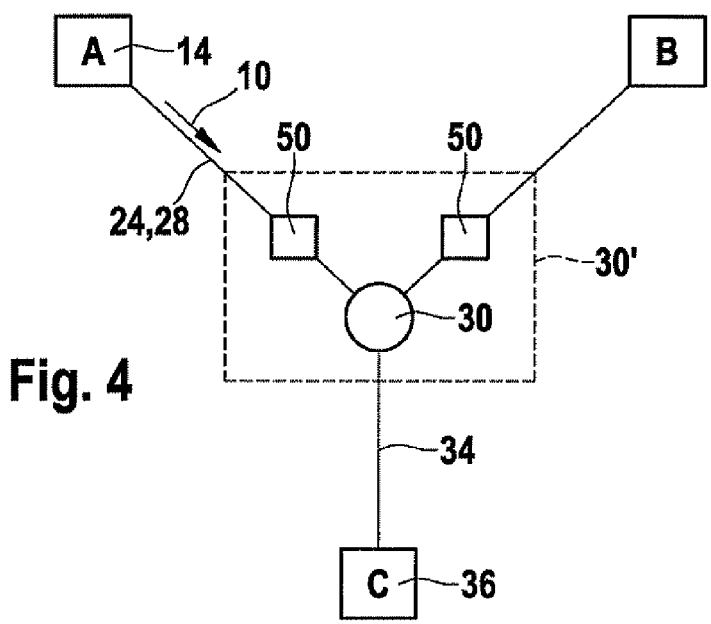
FIG. 4 shows a data-transmission system according to the present invention, having a device for measuring and partially compensating the asymmetrical delay of the transmitted signal, the device being disposed within the network structure.

FIG. 4 shows one possible specific embodiment of the present invention. By way of example, FIG. 4 shows a data transmission system having a relatively simple network structure. The data-transmission system includes three users A, B, C, between which data encoded in a signal 10 are able to be transmitted via a network structure. At a random location in the active or passive networks of the network structure, a measuring and compensating device 50 according to the present invention may be situated. More specifically, device 50 may be disposed in signal lines 24, 28, but also in signal line 34. In the exemplary embodiment shown in FIG. 4, a measuring and compensating device 50 is disposed at a random location in signal lines 24, 28, and an additional device 50 in a signal line between user B and active star 30. Of course, it is also possible that both devices 50 are an integral component of the transceivers (transmit-receive units) of active star 30 or an integral component of active star 30 itself. Active star 30 with both devices 50 as integral component is denoted by reference numeral 30' in its entirety.

Delay value $\tau$ by which a rising or falling signal edge of signal 10 is delayed in devices 50 may be chosen by estimating the anticipated delay by active star 30 and connection line 34, so that the asymmetrical delay of signal 10 upon receipt in user 36 is as low as possible. Thus, when determining delay value t, the estimated delay still to be expected, or the asymmetrical delay measured at an earlier instance, is taken into account on the further transmission route. However, it would also be possible that an additional measuring and compensating device 50 (not shown) is provided within connection line 34, preferably as closely as possible to user C, which reduces or, in the ideal case, compensates the asymmetrical delay due to the transmission of signal 10 via active star 30 and connection line 34 (and possibly still other active and/or passive components situated in the transmission channel).

Devices 50 according to the present invention introduced into the network structure of the data-transmission system from FIG. 4, preferably include a detector, in particular for measuring, the asymmetrical delay, so that delay time $\tau$ for programmable delay unit 52, preferably for each individual data frame, is able to be adjusted in an adaptive manner. However, with conventional network topologies it would also be possible to determine the asymmetrical delay already in advance of the data transmission, for example at the factory, and to fixedly specify delay values $\tau$ accordingly. In this case, the device for measuring the asymmetrical delay in devices 50 could be dispensed with.

Figure 5:
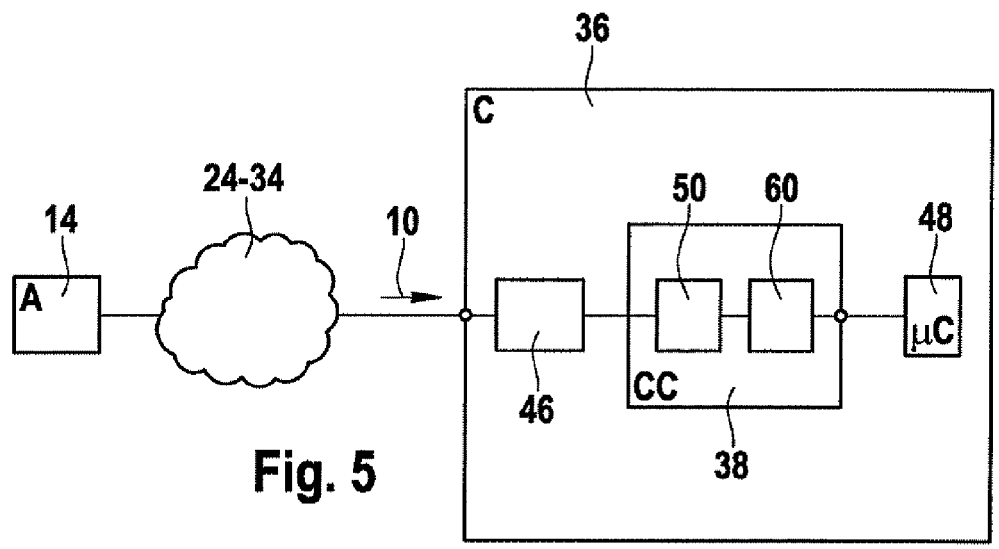
FIG. 5 shows a communications controller according to the present invention of a data-transmission system, having a device for measuring and at least partially compensating the asymmetrical delay of the transmitted signal.

FIG. 5 depicts an additional exemplary embodiment of the present invention. FIG. 5 shows a transmitting user 14 and a receiving user 36 and, in-between, a more or less complex network structure 24-34. Receiving user 36 has a transceiver 46, which may also be denoted as transmit-receive unit or also as level converter in a simple case. Signal 10 received via transceiver 46 arrives at communications controller 38 and then reaches host processor 48 of receiving user 36. Communications controller 38 includes a decoding unit 60, which is also referred to as scanning means or as decoder. Decoder 60 is used to scan the data bits encoded in received signal 10 in the manner already described previously. Upstream from decoder 60 is a measuring and compensating device 50 according to the present invention for measuring and at least partially compensating the asymmetrical delay.

Figure 6:
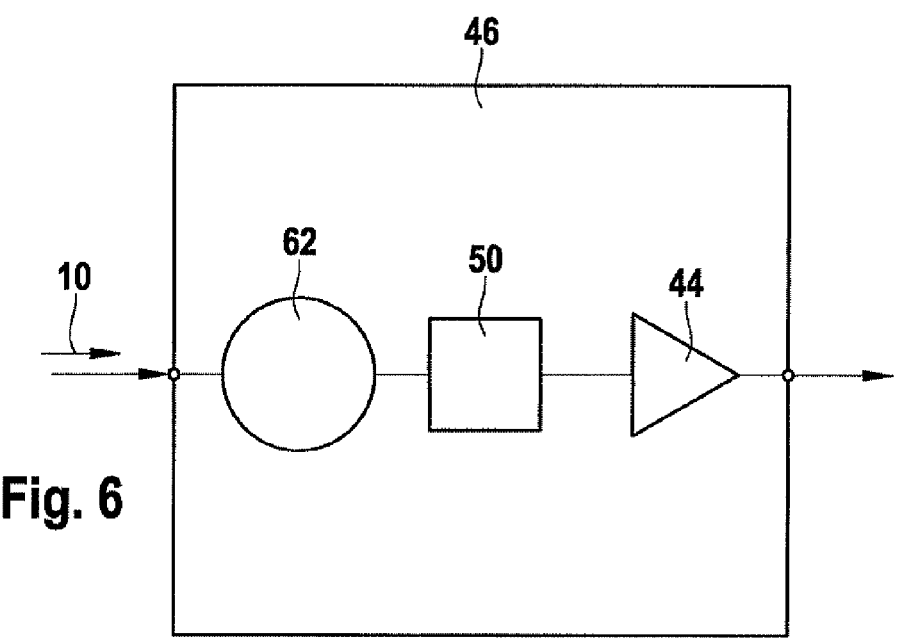
FIG. 6 shows a transceiver according to the present invention of a communications controller of a data-transmission system, having a device for measuring and at least partially compensating the asymmetrical delay of the transmitted signal.

FIG. 6 shows another exemplary embodiment of the present invention, in which measuring and compensating device 50 is disposed in a transceiver 46. Transceiver 46 includes a what is generally known as a transceiver core 62 for realizing the central transceiver function, as well as a driver unit 44, which may also be referred to as bus driver. Due to measuring and compensating device 50 in transceiver 46, the asymmetrical delay of received signal 10 is reduced, ideally compensated, even before signal 10 is decoded.

What is claimed is:

1. A method for transmitting data, encoded in a signal, between a transmitting user and a receiving user of a data-transmission system via a network structure of the data-transmission system, the method comprising:
    transmitting data encoded in the signal serially in a bit-by-bit manner in data frames having a defined structure, each bit of the data encoded in the signal being sampled in the receiving user, the signal being asymmetrically delayed due to the transmission via the network structure; and
    determining an asymmetrical delay of the signal at at least one point in the network structure and at least partially compensating for the asymmetrical delay of the signal before the receiving user samples bits of the data encoded in the signal,
    wherein the asymmetrical delay of the signal is caused by a time duration difference between the signal changing from rising to falling edge and from falling to rising edge in a transmission protocol utilized in the data transmission, and
    wherein the asymmetrical delay of the signal is determined in advance of the data transmission and compensated for during the data transmission.

2. The method as recited in claim 1, wherein the asymmetrical delay of the signal is determined and stored at a factory and called up again for the compensation.

3. The method as recited in claim 1, wherein the asymmetrical delay of the signal is determined and stored and called up again for the compensation with the aid of a ready-for-use data-transmission system.

4. The method as recited in claim 2, wherein the asymmetrical delay is one of estimated, modeled or measured.

5. The method as recited in claim 1, wherein the asymmetrical delay of the signal is determined and compensated during the data transmission.

6. The method as recited in claim 5, wherein the determination and the compensation of the asymmetrical delay of the signal is implemented as closely in time to each other as possible in direct succession.

7. The method as recited in claim 5, wherein the asymmetrical delay is one of estimated, modeled or measured.

8. The method as recited in claim 5, wherein the asymmetrical delay is measured based on an interval of a change of the signal from rising to falling edge or from falling to rising edge required in a transmission protocol utilized in the data-transmission system.

9. The method as recited in claim 8, wherein the interval between a rising edge of a frame start sequence and a falling edge of a byte start sequence of a data frame is measured.

10. The method as recited in claim 1, wherein a suitable delay value is determined based on the determined asymmetrical delay, by which a signal edge that is less heavily delayed due to the transmission via the network structure is delayed in order to at least partially compensate for the asymmetrical delay.

11. The method as recited in claim 10, wherein the delay value is determined using combinatorics or a suitable calculation algorithm based on the determined asymmetrical delay.

12. The method as recited in claim 10, wherein the determined delay is forwarded to a programmable delay unit, disposed at a random location in the network structure, but downstream from the encoding of the signal to be transmitted in the transmitting user and prior to decoding of the signal in the receiving user, by which delay unit a signal edge that is less heavily delayed due to the transmission via the network structure is delayed by the determined delay.

13. The method as recited in claim 12, wherein the signal edge less heavily delayed due to the transmission via the network structure is delayed with an accuracy of at least 1 ns.

14. The method as recited in claim 13, wherein the signal edge less heavily delayed due to the transmission via the network structure is delayed with an accuracy of 0.5 ns.

15. A device comprising:
    a component configured to measure and partially compensate an asymmetrical delay of a signal;
    wherein the asymmetrical delay of the signal is caused by a time duration difference between the signal changing from rising to falling edge and from falling to rising edge in a transmission protocol utilized in a data transmission,
    wherein the asymmetrical delay of the signal is determined in advance of the data transmission and compensated for during the data transmission, and
    wherein the component of the device that is disposed at any random point in a network structure of a data-transmission system, the data-transmission system having a plurality of users, the network structure being formed between the users, and an arrangement adapted to transmit serially bit-by-bit data, encoded in a signal, between a transmitting user and a receiving user via the network structure in data frames having a defined structure, the data transmission via the network structure causing the asymmetrical delay of the signal, and an arrangement adapted to sample each bit of the data encoded in the signal disposed in the receiving user of the data-transmission system,
    wherein the component of the device is disposed upstream from a scanning component in the receiving user.

16. The device as recited in claim 15, wherein the device has a component adapted to measure and partially compensate the asymmetrical delay in the signal during data transmission.

17. A system for transmitting data encoded in a signal, the system comprising:
    a plurality of users;
    a network structure formed between the users;
    a transmitter adapted for bit-by-bit, serial transmission of the data encoded in the signal between a transmitting user and a receiving user via the network structure in data frames having a defined structure, the data transmission via the network structure causing an asymmetrical delay of the signal; and
    a scanner adapted to scan each bit of the data encoded in the signal and disposed in the receiving user;
    wherein a device, which is adapted to measure and at least partially compensate the asymmetrical delay of the signal, is disposed at at least one point in the network structure, upstream from the scanner, wherein the asymmetrical delay of the signal is caused by a time duration difference between the signal changing from rising to falling edge and from falling to rising edge in a transmission protocol utilized in the data transmission, and wherein the asymmetrical delay of the signal is determined in advance of the data transmission and compensated for during the data transmission.

18. The system as recited in claim 17, wherein the network structure includes at least one of active and passive elements, the at least one of the active and passive elements including at least one of: connection lines, transmitters, throttles, communications controllers, transmit-receive devices, level converters, active stars, terminal resistors, and capacitors for split termination.

19. The system as recited in claim 17, wherein the device adapted to measure and compensate includes an arrangement adapted to measure and compensate during data transmission.

20. A user of a data-transmission system for transmitting data encoded in a signal, the user comprising:
a device, upstream from a component adapted to sample, for measuring and at least partially compensating an asymmetrical delay of the signal,
wherein the asymmetrical delay of the signal is caused by a time duration difference between the signal changing from rising to falling edge and from falling to rising edge in a transmission protocol utilized in a data transmission,
wherein the asymmetrical delay of the signal is determined in advance of the data transmission and compensated for during the data transmission, and
wherein the data-transmission system has a plurality of users, a network structure formed between the users, and a transmitter adapted for bit-by-bit serial transmission of the data encoded in the signal between a transmitting user and a receiving user via the network structure in data frames having a defined structure, the data transmission via the network structure causing the asymmetrical delay of the signal, and the component adapted to sample each bit of the data encoded in the signal disposed in the receiving user.

21. The user as recited in claim 20, wherein the device for measuring and compensating includes a component adapted to measure and compensate during data transmission.

22. A communications controller of a receiving user of a data-transmission system for transmitting data encoded in a signal, the communications controller comprising:
a component adapted for sampling each bit of data encoded in the signal; and
a device, upstream from the component adapted for sampling, for measuring and at least partially compensating an asymmetrical delay of a signal;
wherein the asymmetrical delay of the signal is caused by a time duration difference between the signal changing from rising to falling edge and from falling to rising edge in a transmission protocol utilized in the data transmission,
wherein the asymmetrical delay of the signal is determined in advance of the data transmission and compensated for during the data transmission, and
wherein the data-transmission system has a plurality of users, a network structure formed between the users, and a transmitter adapted for bit-by-bit, serial transmission of the data encoded in the signal between a transmitting user and a receiving user via the network structure in data frames having a defined structure, the data transmission via the network structure causing the asymmetrical delay of the signal.

23. The communications controller as recited in claim 22, wherein the device for measuring and compensating includes a component adapted to measure and compensate during data transmission.

24. A transmit-receive unit of a receiving user of a data-transmission system for transmitting data encoded in a signal, the transmit-receive unit comprising:
a device, upstream from a component for sampling each bit of the data encoded in the signal, for measuring and at least partially compensating a asymmetrical delay of the signal;
wherein the asymmetrical delay of the signal is caused by a time duration difference between the signal changing from rising to falling edge and from falling to rising edge in a transmission protocol utilized in the data transmission,
wherein the asymmetrical delay of the signal is determined in advance of the data transmission and compensated for during the data transmission, and
wherein the device of the data-transmission system that has a plurality of users, a network structure being formed between the users and a transmitter adapted for bit-by-bit, serial transmission of the data encoded in the signal between a transmitting user and the receiving user via the network structure in data frames having a defined structure, the data transmission via the network structure causing the asymmetrical delay of the signal, and the component for sampling each bit of the data encoded in the signal are situated in the receiving user.

25. The transmit-receive unit as recited in claim 24, wherein the measuring and compensating device has a component for measuring and compensating during data transmission.

26. An active star disposed in a network structure of a data-transmission system for transmitting data encoded in a signal, the active star comprising:
a device for measuring and at least partially compensating an asymmetrical delay of the signal;
wherein the asymmetrical delay of the signal is caused by a time duration difference between the signal changing from rising to falling edge and from falling to rising edge in a transmission protocol utilized in the data transmissions
wherein the asymmetrical delay of the signal is determined in advance of the data transmission and compensated for during the data transmission, and
wherein the data-transmission system has a plurality of users, a network structure formed between the users, and a transmitter for bit-by-bit, serial transmission of the data encoded in the signal, between a transmitting user and a receiving user via the network structure and the active star disposed therein, in data frames having a defined structure, and the data transmission via the network structure causing the asymmetrical delay of the signal, and a device adapted for sampling each bit of the data encoded in the signal being disposed in the receiving user, wherein, upstream from the device adapted for sampling.

27. The active star as recited in claim 26, wherein the measuring and compensating device has a component to measure and compensate during data transmission.

* * * * *